United States Patent [19]

Babjak et al.

[11] Patent Number: 5,545,392
[45] Date of Patent: Aug. 13, 1996

[54] PROCESS FOR PRODUCING NICKEL HYDROXIDE FROM ELEMENTAL NICKEL

[75] Inventors: Juraj Babjak; Victor A. Ettel, both of Mississauga, Canada

[73] Assignee: Inco Limited, Toronto, Canada

[21] Appl. No.: 402,368

[22] Filed: Mar. 13, 1995

Related U.S. Application Data

[63] Continuation-in-part of Ser. No. 392,302, Feb. 21, 1995, abandoned, which is a continuation of Ser. No. 216,036, Mar. 22, 1994, abandoned.

[51] Int. Cl.⁶ .......................... C01B 13/14; C01G 53/04
[52] U.S. Cl. .......................... 423/592; 429/105; 429/223
[58] Field of Search .......................... 204/96; 429/105, 429/223; 423/144, 150.2, 592; C25B 1/00

[56] References Cited

U.S. PATENT DOCUMENTS

| | | | |
|---|---|---|---|
| 5,384,216 | 1/1995 | Teraoka et al. | 429/223 |
| 5,391,265 | 2/1995 | Krynitz et al. | 204/96 |

FOREIGN PATENT DOCUMENTS

| | | | |
|---|---|---|---|
| 0623339 | 7/1961 | Canada | 204/96 |
| 6-295727 | 10/1994 | Japan | |
| 6-290776 | 10/1994 | Japan | |

OTHER PUBLICATIONS

Xia et al., Studies on the Kinetics of Nickel Dissolution in Aqueous Ammoniacal Solutions, Inst. Chem. Metall. Acad. Sin., Peking Peop. Rep. China pp. 290–301; 1980 no month available translation pp. 1–28 (only).

Xia et al., Studies on the Kinetics of Nickel Dissolution in Aqueous Ammoniacal Solutions, Inst. Chem. Metall., Acad. Sin., Peking, Peop. Rep. China pp. 290–301; 1980 no month available.

Xia et al., Studios on the Kinetics of Ni Dissolution in Aqueous Ammoniacal Solution, Institute of Chemical Metallurgy, Academia, Sinica, pp. 290–301 (1980) no month available.

*Primary Examiner*—Kathryn Gorgos
*Attorney, Agent, or Firm*—Blake T. Biederman; Edward A. Steen

[57] ABSTRACT

The invention provides a method of producing nickel hydroxide from elemental metal. Elemental nickel is first introduced into an aqueous ammonia or ammonia/ammonium salt solution capable of dissolving nickel. The potential, as measured by a standard calomel electrode, is allowed to reach a negative or reducing level. Oxygen is added to the aqueous solution at a rate that maintains the negative potential to facilitate the conversion of elemental nickel to nickel hydroxide. Nickel hydroxide may be readily precipitated from the aqueous solution.

19 Claims, 1 Drawing Sheet

PROCESS FOR PRODUCING NICKEL HYDROXIDE FROM ELEMENTAL NICKEL

This is a continuation-in-part of application U.S. Ser. No. 08/392,302, filed Feb. 21, 1995, now abandoned. U.S. Ser. No. 08/392,302 was a continuation of application U.S. Ser. No. 08/216,036, filed Mar. 22, 1994, now abandoned.

FIELD OF THE INVENTION

This invention relates to a process for producing nickel hydroxide from nickel powders. In particular, this invention relates to conversion of nickel powder to nickel hydroxide in aqueous solutions containing ammonia and nickel ions.

BACKGROUND OF THE INVENTION

Nickel hydroxide is an important material in the manufacture of positive nickel electrodes for alkaline batteries and industrial applications. Essentially, all known processes for making nickel hydroxide are based exclusively on caustic precipitation of nickel hydroxide from nickel salt solutions. For example, typical nickel salt solutions for forming nickel hydroxide include nickel sulfate, nickel chloride or nickel nitrate. Unfortunately, methods of production that rely upon caustic precipitation of nickel salts involve a number of operating steps and produce environmentally unacceptable effluents.

The direct conversion of Ni powder into nickel hydroxide was first described in Australian Pat. No. 626,648 ('648). The process of the '648 patent disclosed the use of ammonia and oxygen under pressure to form nickel hydroxide from nickel powder in aqueous solutions. However, the '648 patent states that conversion of Ni powders into nickel hydroxide in ammonium hydroxide solutions can be achieved, at practical rates, only at elevated temperatures and oxygen partial pressures. At lower temperatures and oxygen partial pressures, the rate of Ni conversion is impractically slow. For example, only about 0.1% Ni dissolved from nickel powder in a 10 molar $NH_3$ solution at 55° C. and 2 atmospheres oxygen partial pressure during 4 hours of batch reaction.

It was later disclosed in EPO Pat. Publication No. 575,093 ('093) that when using nitric acid as an oxidant of nickel powder, atmospheric operations may be used to produce nickel hydroxide. However, the problem with the process of the '093 publication is that nitrate impurity levels exceed customer requirements for some applications. The use of nitric acid is believed to cause entrainment of nitrate in the nickel hydroxide.

It is an object of this invention to provide a method for producing nickel hydroxide from nickel powder at atmospheric pressure conditions.

It is a further object of this invention to provide a method of reducing nitrate impurities.

It is a further object of this invention to control crystallinity of nickel hydroxide produced from nickel powder.

SUMMARY OF THE INVENTION

Figure 1:
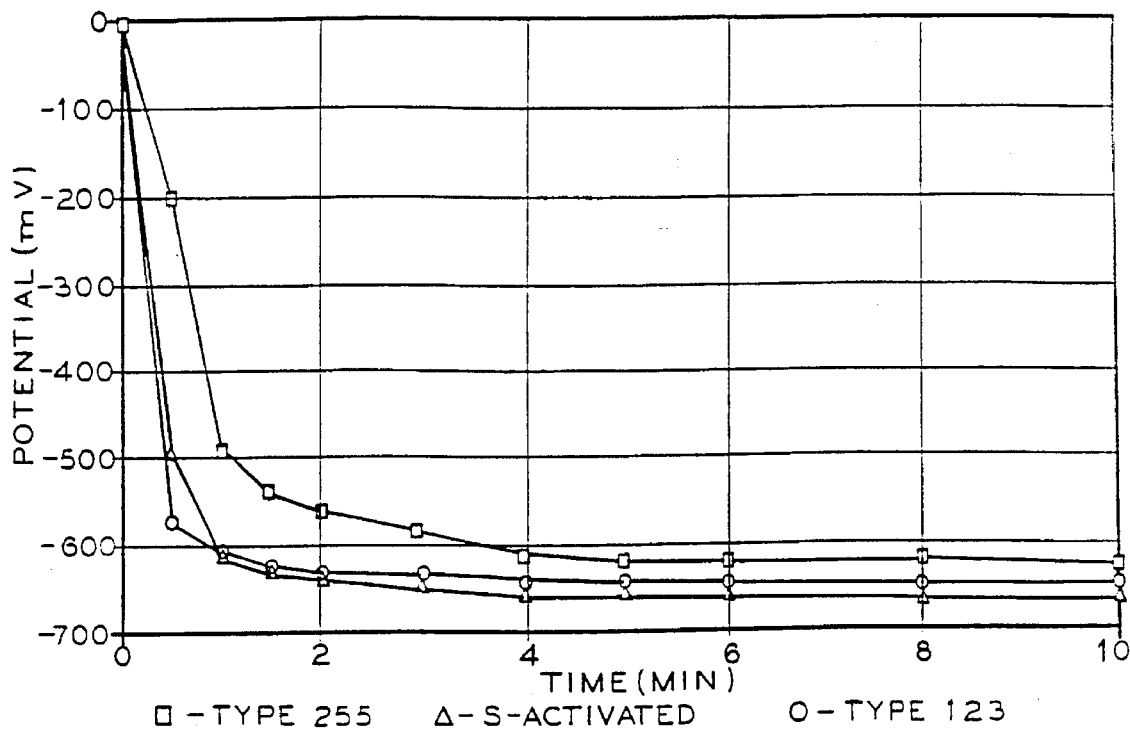
FIG. 1 is a plot of potential as a function of time of nickel powders in 1N $(NH_4)_2 SO_4$ solution at a pH of 8.8 and a temperature of 70° C.

The invention provides a method of producing nickel hydroxide from elemental metal. Elemental nickel is first introduced into an aqueous ammonia or ammonia/ammonium salt solution having the capability of dissolving nickel. The potential, as measured by a standard calomel electrode, is allowed to reach a negative or reducing level. Oxygen is added to the aqueous solution at a rate that maintains the negative potential to facilitate the conversion of elemental nickel to nickel hydroxide. Nickel hydroxide may be readily precipitated from the aqueous solution.

DESCRIPTION OF PREFERRED EMBODIMENT

It has been discovered that elemental nickel can be converted directly into nickel hydroxide in an aqueous solution at atmospheric pressure using a controlled rate of oxygen addition. Advantageously, the nickel is in the form of particulate or powder having a surface area of at least 0.2 $m^2/g$. The oxygen addition is controlled to maintain a negative or reducing redox potential, with respect to a standard calomel electrode (S.C.E.). At negative redox potentials, the reactions responsible for nickel powder conversion into nickel hydroxide operate effectively at atmospheric oxygen partial pressures.

The aqueous solution should contain free ammonia and be capable of dissolving nickel. (Unless the solution is capable of dissolving nickel, the reaction will not proceed.) A relatively small concentration of ammonium is inherently present in the ammonia-containing solution, since the ammonium/ammonia reaction is reversible. The solution optionally contains an anion. Advantageously, the anion arises from an ammonium salt, such as e.g. ammonium sulfate, acetate, chloride or formate. Ammonium salts may be added to increase solubility of nickel in the solution. Ammonium sulfate has been found to be particularly effective at increasing reaction rate. Initial tests with ammonium acetate have produced acceptable results that are comparable to additions of ammonium sulfate. However, recent tests have indicated that the reaction readily proceeds in solutions free of or substantially free of anions.

EXAMPLES

Example 1

Initially, 1.5 L of approximately 1.2 normal ammonium sulfate solution was placed into a 2 L reaction-vessel. The reaction vessel was equipped with four baffles, 6-blades radial turbine impeller, a pH electrode and a potential electrode. The reactor was opened to the atmosphere via a condenser. The pH of the solution was adjusted to 9 using 30% ammonium hydroxide and the mixture was then heated to 70° C. An addition of 225.7 g of INCO type 255 nickel powder was then reacted in the vessel over a period of about 15 minutes (INCO is a trademark of the Inco family of Companies.) At the end of this period, the solution potential was measured and showed a value of −750 mV with respect to a standard calomel electrode. (All potentials listed in this specification were measured with a standard calomel electrode.) Oxygen flow was introduced at this point into the suspension at the rate of 50 mL/minute. The potential of the reaction mixture remained unchanged after reacting for 2 h and 40 minutes. The reaction was allowed to proceed for a total of 20 h, at which point the potential increased to −15 mV. The resulting 1.2 L nickel hydroxide slurry was filtered and the filter cake washed with water. The filtration of nickel hydroxide was very good. The remaining about 300 mL of the nickel hydroxide slurry was saved as a seed material for the next test.

Dry filter cake analyzed in mass %: 62.6 total Ni, 2.75 elemental nickel and 0.055 $NH_3$ and the filtrate contained in g/L: 31.2 Ni, 64.9 total ammonia and 48 sulfate.

Example 2

The test of Example 1 was repeated using the filtrate and 300 mL of unfiltered slurry from the previous test (Example 1) as the feed solution. The potential of the suspension after the addition of INCO type 255 nickel powder into the reactor was around −700 mV and remained unchanged for at least 4.5 h of reacting. The test was terminated after 23 h, at which point the potential increased to 0 mV.

The nickel hydroxide produced analyzed in mass %: 0.37 elemental Ni, 62.0 total Ni and 0.058 $NH_3$ and the filtrate analyzed in g/L: 30.7 Ni, 59.5 total ammonia and 55.5 sulfate.

Example 3

The test of Example 1 was repeated using the filtrate from the test of Example 2 and INCO type 255 nickel powder. However, the oxygen addition at the rate of 50 mL/min. was initiated too soon, when the redox-potential was at only about −120 mV. No reaction was observed during 16 h of operation at which point the experiment was terminated.

Example 4

Filtrate from the test of Example 3 was placed into the same reaction vessel and heated to 55° C. 225 g of INCO type 255 powder was then introduced into the reactor and allowed to agitate until the potential decreased to −670 mV; at which point, the oxygen addition was started at the rate of 50 mL/min. The potential was followed and recorded versus time:

TABLE 1

| Time, Min | Potential, mV |
|---|---|
| 0 | −670 - Oxygen addition started |
| 10 | −640 |
| 20 | −596 |
| 55 | −610 |
| 130 | −220 |
| 180 | −160 |

The reaction of nickel conversion into nickel hydroxide, which started as expected in view of Examples 1 and 2, have stopped after some 100 minutes of reacting, due to a too high a rate of oxygen addition at this operating temperature (55° C.).

Example 5

Potential of nickel suspension was measured as a function of time and temperature. Approximately, 1N solution of ammonium sulfate was spiked with a concentrated aqueous ammonia to a pH of about 9. An amount of 750 mL of this solution was placed into an agitated vessel, which was temperature controlled. When the solution was heated to the desired temperature, 110 g of INCO type 255 nickel was added and the potential was followed and recorded versus time. The result for two different temperatures are shown below:

TABLE 2

| Time, (Min.) | 50° C. | 70° C. |
|---|---|---|
| 0 | 0 | 0 |
| 0.5 | −20 | −200 |
| 1 | −40 | −490 |
| 1.5 | −150 | −540 |
| 2 | −170 | −560 |
| 3 | −250 | −585 |
| 4 | −350 | −610 |
| 5 | −400 | −620 |
| 6 | −420 | −620 |
| 8 | −470 | −620 |
| 10 | −500 | −630 |

It can be seen that the potential of the above nickel powder suspensions is a very strong function of both the contact time and temperature.

Figure 2:
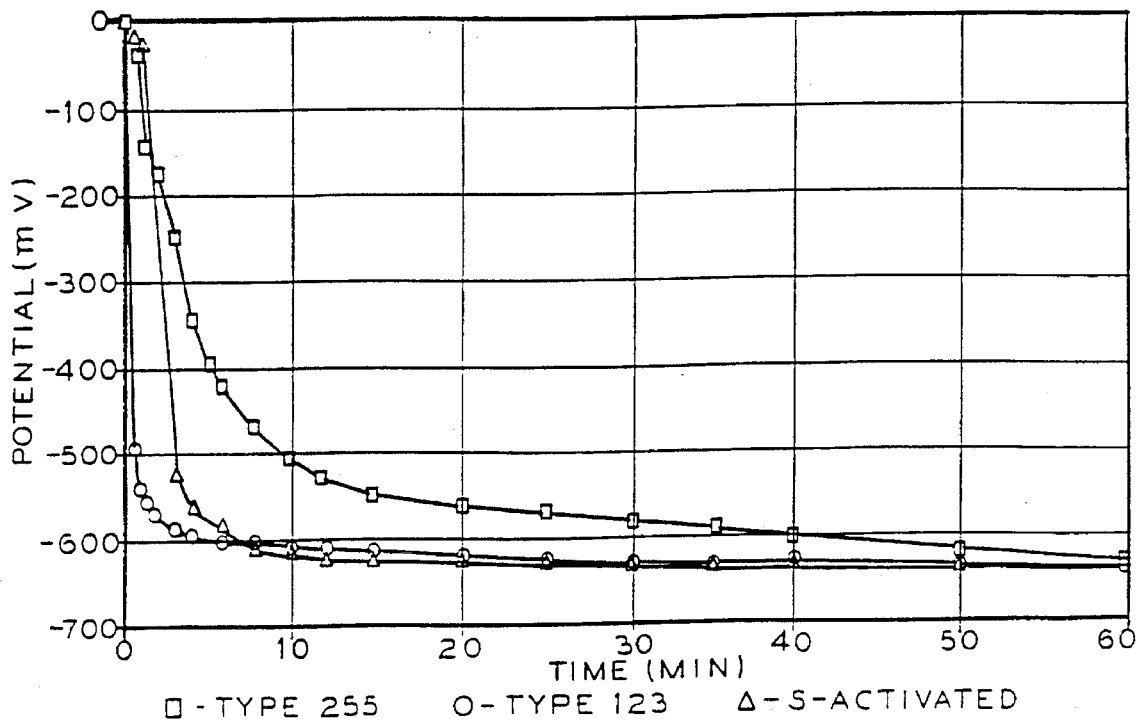
FIG. 2 is a plot of potential as a function of time of nickel powders in 1N$(NH_4)_2 SO_4$ solution at a pH of 9.1 and a temperature of 50° C.

Similar tests were performed using other nickel powders (INCO type 123 powder and a sulfur activated powder). The results are shown diagrammatically in FIG. 1 for 70° C. and in FIG. 2 for 50° C. It can be seen from the Figures that powder type also has a significant effect on the rate of developing a highly reducing potential of the nickel powder suspension.

Example 6

The effect of solution pH on the potential of nickel powder suspensions was studied for two different powders using a similar procedure as that applied in Example 5, except that the temperature was kept at 50° C. The pH of the feed solution (1N ammonium sulfate) was adjusted to the desired value, using 30% ammonia, prior to the nickel powder addition. The results are presented in Table 3 below:

TABLE 3

| | Potential [mV] | | | |
|---|---|---|---|---|
| Time, (Min.) | Type 123 pH = 7.0 | Type 123 pH = 7.5 | Type 255 pH = 8.5 | Type 255 pH = 9.0 |
| 0 | +90 | +45 | | |
| 1 | −160 | −270 | −280 | −40 |
| 2 | −360 | −460 | −260 | −170 |
| 3 | −495 | −530 | −250 | −250 |
| 4 | −520 | −560 | −250 | −350 |
| 5 | | −570 | −260 | −400 |
| 6 | −560 | −590 | −260 | −420 |
| 7 | | −595 | | |
| 8 | | −600 | −390 | −470 |
| 9 | | −610 | | |
| 10 | −580 | −615 | −390 | −500 |
| 12 | | | −500 | −525 |
| 15 | −590 | −624 | −540 | −550 |
| 20 | −590 | −625 | −560 | −560 |
| 25 | −593 | −628 | −580 | −570 |
| 30 | −593 | −630 | −590 | −580 |
| 40 | | | −605 | −600 |
| 50 | | | −615 | −610 |
| 60 | | | −625 | −625 |

The above Example illustrated that the rate of potential decrease (or the rate of nickel powder activation) increases with the solution pH for both INCO type 123 and 255 powders. The activation of INCO type 123 powder was more rapid than that of INCO type 255 powder (In spite of its greater surface area 0.68 $m^2/g$ versus 0.34–0.44 $m^2/g$ for type 123.)

Example 7

The effect of thiosulfate anion addition to the feed solution on the nickel powder activation was tested. Tests were performed in 1N ammonium sulfate solution at pH=7 and 50° C. in the absence and in the presence of 1 g/L sodium thiosulfate ($Na_2S_2O_3$) using INCO type 123 nickel powder. The results are shown in Table 4 below:

TABLE 4

| Time [min] | Potential [mV] | |
| --- | --- | --- |
| | $Na_2S_2O_3$ Absent | 1 g/L $Na_2S_2O_3$ |
| 0 | +90 | +45 |
| 1 | −160 | −540 |
| 2 | −360 | −545 |
| 3 | −495 | −553 |
| 4 | −520 | −562 |
| 5 | | −572 |
| 6 | −560 | −580 |
| 8 | | −590 |
| 10 | −580 | −592 |
| 15 | −590 | −592 |
| 20 | −590 | −593 |
| 25 | −593 | −592 |
| 30 | −593 | −590 |

Table 4 illustrates that a small addition of thiosulfate anion enhances the rate of nickel powder activation quite substantially.

Example 8

The potential of nickel powder suspensions was measured in three acidic solutions. 1.7 L of distilled water was placed into an agitated vessel, which was temperature controlled. After heating the contents to 50° C., a solution of approximately 1M $H_2SO_4$ was added until the desired pH was obtained. Then 256.9 g of INCO type 123 powder were added into the vessel and an automatic titrator was used to maintain the desired pH with the 1M $H_2SO_4$ solution. The potential of the nickel powder suspension was measured and re,corded versus time. The results are presented in Table 5 below.

TABLE 5

| Time [min] | Potential [mV] | | |
| --- | --- | --- | --- |
| | pH = 2.0 | pH = 4.0 | pH = 6.0 |
| 0 | — | — | +120 |
| 1 | −420 | −450 | −140 |
| 2 | −430 | −495 | −180 |
| 3 | — | −510 | −190 |
| 4 | −430 | −510 | −190 |
| 5 | −430 | −510 | −200 |
| 6 | — | −510 | — |
| 7 | −420 | −510 | −210 |
| 8 | — | −510 | — |
| 10 | — | −510 | −450 |
| 15 | −420 | −510 | −510 |
| 20 | | | −510 |
| 25 | | | −550 |
| 30 | | | −510 |

From Table 5, it was demonstrated that the potential of nickel powder suspensions may be readily reduced (or nickel powder activated) quite readily in acidic solutions, containing as little as around 0.0000001 equivalents of $H^+$ per liter. The rate on nickel powder activation increases with the acid concentration and becomes quite rapid somewhere between 0.000001 and 0.0001 $H^+$/L.

Example 9

The potential of nickel powder suspension was measured at 53° C. in 1N ammonium acetate, adjusted to pH=9, with 30% ammonia, using INCO type 123 powder. The results are given below:

TABLE 6

| Time [min] | Potential [mV] |
| --- | --- |
| 0 | −91 |
| 1 | −720 |
| 2 | −760 |
| 3 | −780 |
| 4 | −792 |
| 5 | −797 |
| 6 | −800 |
| 8 | −803 |
| 10 | −803 |
| 15 | −801 |
| 20 | −800 |
| 25 | −799 |
| 30 | −797 |

The activation of nickel powder in ammonium acetate is also very rapid.

Example 10

The feed solution for this test was made-up by mixing 102 g of concentrated ammonia (29% $NH_3$) with 1400 mL of distilled water. The ammonia concentration in the resulting solution was approximately 1.2N and had a pH of 11.4 at 25° C. The test apparatus consisted of a 2 L resin kettle (glass cylindrical vessel) equipped with four baffles, a 5 cm diameter radial turbine impeller having 6 blades, a reflux condenser (to prevent ammonia-water losses during the tests), a redox combination electrode, an oxygen sparger and a heating mantle to maintain the desired temperature. The feed solution was heated to 60° C., at which temperature the pH meter indicated a pH of 9.9, and after reaching this temperature 170 g of INCO type 123 Ni powder were added. The redox potential decreased from a positive value to −710 mV in approximately 20 min. Then, 170 g of $Ni(OH)_2$ seeds were added and after about 2 h the oxygen was started at a rate of 30 mL/min. The oxygen flow remained on for a total of 1430 minutes. After 1430 minutes, the redox was 0 mV and the test was terminated. The reacted slurry was then filtered and the cake washed with water and dried in an oven at 70° C. The mass of wet cake recovered was 433 g and the mass of dry solids recovered was 350 g. Analysis of the solids was 0.08 (mass %) elemental nickel and 63.8 (mass %) total nickel. The conversion of Ni powder into nickel hydroxide was essentially complete.

Example 11

This Example was carried out in a similar way as Example 10, except that the feed solution was approximately 2N ammonia and the operating temperature was 80° C. Also the ammonia concentration was kept constant during the test by adding a concentrated aqueous ammonia on demand to maintain a constant pH of 11.2. The initial potential, following the activation was −780 mV. Oxygen flow was started at this point at a rate of 50 mL/min. The test was terminated after 1040 minutes (when the potential became positive). The reacted slurry was filtered, the cake washed with water, dried in an oven at 70° C. and analyzed. The dried cake contained 63.6% Ni and 0.04% $NH_3$, indicating essentially complete conversion of Ni powder into nickel hydroxide.

From the above examples, a continuous process for making nickel hydroxide can be formulated in which nickel powder and a recycled ammonia/ammonium sulfate (or other ammonium salt) aqueous solution are introduced into the reaction system, comprising a single reactor or a number of reactors in series. It is recognized that elemental nickel may be used in any form. Advantageously, elemental nickel is added as nickel powder due to its simplified handling characteristics, commercial availability and relatively large surface area. The reactor apparatus, which operates at atmospheric pressure, is supplied with oxygen, ammonia, nickel and optionally an ammonium salt at controlled rates for continuous operations. Oxygen is added at a controlled rate in order to maintain the reducing potential of the reaction mixture, to cause an oxidative nickel dissolution, which leads to the precipitation of the desired nickel hydroxide product. Oxygen may alternatively be added from a donor source or from an oxygen-containing gas. During operation, oxygen diffusion appears to control the reaction rate. In fact, under normal operating conditions, the steps of dissolution of nickel to formation of nickel hydroxide appear to occur instantaneously. Since oxygen diffusion rate appears to control the reaction, it is preferred to add oxygen in substantially pure form.

Elemental nickel containing a passive film may be activated by several separate methods at pH levels from less than 0 to as high as 14. For purposes of this specification, activated nickel is defined as nickel capable of dissolving in an ammonia-containing solution at atmospheric pressure in the presence of oxygen. First, nickel may be activated by contacting the feed powder with recycled process solution in a separate agitating tank with the resulting suspension being fed into a reactor. Second, the powder may be activated in a separate solution such as dilute acid and transferring the activated nickel after a separation operation into the reactor. Third, the nickel may be activated by introducing it directly into a reactor maintained at a redox-potential below about −200 mV as measured with respect to a standard calomel electrode. Finally, any suitable reducing agent such as hydrogen gas may be used to reduce any passive oxygen film surrounding the nickel to effectively activate the nickel. Using a separate vessel for activation provides the advantage of improved pH control. Alternatively, the first and second activation steps may be preformed in batch operations.

After a reaction has initiated, the reaction continues to operate effectively even when the temperature decreases or the potential increases. Advantageously, potentials below about −100 mV with respect to S.C.E., are maintained to facilitate the conversion of nickel powder into nickel hydroxide. Advantageously, potential is maintained between about −100 mV and −600 mV for effective conversion. Most advantageously, potential is maintained within the range of −200 mV to −500 mV. Advantageously, pH of the solution is maintained between 8.5 and 12 during conversion to nickel hydroxide. Most advantageously, pH of the solution is maintained between 9 and 12 during conversion to nickel hydroxide. Prior to their introduction into the reaction apparatus, the recycled feed solution and the nickel feed powder may optionally be contacted for a suitable period of time to reduce the supsension's potential to the desired level.

Experimentation has indicated that the operating temperature may be between room temperature and the boiling temperature. For purposes of this specification, room temperature is defined as being about 20° C. However, it has been found that nickel hydroxide powders produced at temperatures close to the boiling temperature are more crystalline and less amorphous than nickel hydroxide powders produced at lower temperatures. The end-use of nickel hydroxide would dictate the operating temperature. For example, a general purpose, more crystalline, hydroxide can be produced at higher temperatures (close to the boiling point), while nickel hydroxide destined for batteries should preferably be made at lower temperature, e.g. 50° C. Advantageously, "amorphous" nickel hydroxides are produced at temperatures between 20° and 70° C. Most advantageously, "amorphous" nickel hydroxides are produced at temperatures between 30° C. and 60° C. Optionally, the crystallinity may be reduced by the addition of a suitable crystal habit modifier(s) into the reactor system.

After formation of nickel hydroxide, reacted nickel hydroxide slurry exiting the reaction system is most advantageously subjected to a magnetic separation to remove and recycle any unreacted nickel powder back to the reactor. Initial tests have demonstrated that magnetic separation is a highly effective method for ensuring elemental powder does not contaminate the nickel hydroxide.

Furthermore, a nickel hydroxide slurry is most advantageously subjected to a solid-liquid separation to obtain the desired nickel hydroxide product and the aqueous ammonia or ammonia/ammonium sulfate solution for recycling. Advantageously, nickel hydroxide is filtered and washed. If desired, the water washed cake may be contacted with an alkaline solution (NaOH, KOH, etc.) in order to reduce the concentration of anionic impurities, which have entered the structure of $Ni(OH)_2$ during its crystallization. During this contact, an anion exchange process occurs whereby anion impurities (e.g. sulfate, acetate) in the solids phase are exchanged by an equivalent quantity of hydroxyl group from the aqueous solution. The filter cake may then be dried in a suitable dryer to form the final product. Alternatively, the nickel hydroxide may be classified into a coarse fraction and a fine fraction to control ultimate size of nickel hydroxide particulate. Most advantageously, the fine fraction from the classification step is recycled into a nickel hydroxide precipitation apparatus to provide seed for the growing of coarse nickel hydroxide. It is apparent from the above that the instant process can be conveniently set up as a dosed loop process in which the ammonia or ammonia/ammonium salt reaction medium is recycled and no liquid effluent, containing reaction by-products is generated. The pH of the recycling solution should be checked and adjusted if necessary to be above 8.

While in accordance with the provisions of the statute, there is illustrated and described herein specific embodiments of the invention. Those skilled in the art will understand that changes may be made in the form of the invention covered by the claims and the certain features of the invention may sometimes be used to advantage without a corresponding use of the other features.

The embodiments of the invention in which an exclusive property or privilege is claimed are defined as follows:

1. A method of producing nickel hydroxide from elemental nickel comprising the steps of:

a) introducing the elemental nickel into an aqueous solution to form a mixture, said aqueous solution containing aqueous ammonia and the elemental nickel of said mixture being activated for dissolution into said aqueous solution;

b) dissolving said activated elemental nickel to provide dissolved nickel in said aqueous solution and to provide a negative potential for said mixture of said activated elemental nickel and said aqueous solution;

c) adding oxygen to said aqueous solution at a rate that maintains said negative potential of said mixture of said activated elemental nickel and said aqueous solution to convert said dissolved nickel to nickel hydroxide; and d) precipitating said nickel hydroxide from said aqueous solution on a seed for nickel hydroxide precipitation.

2. The method of claim 1 including the additional step of filtering nickel hydroxide from said aqueous solution.

3. The method of claim 1 wherein said aqueous solution has a pH between about 8.5 and 12 during said converting of said dissolved nickel to nickel hydroxide.

4. The method of claim 1 wherein said aqueous solution has a temperature between about 20° C. and boiling during said conversion of the dissolved nickel to nickel hydroxide.

5. The method of claim 1 wherein said aqueous solution has a temperature between about 20° C. and 70° C. for forming amorphous nickel hydroxide during said conversion of the dissolved nickel to nickel hydroxide.

6. The method of claim 1 wherein said negative potential of said mixture of said activated elemental nickel and said aqueous solution is between about −100 mV and −600 mV during said conversion of the dissolved nickel to nickel hydroxide.

7. The method of claim 1 wherein said aqueous solution is recycled after separation from nickel hydroxide for converting additional elemental nickel into nickel hydroxide.

8. The method of claim 1 wherein said aqueous solution contains an ammonium salt.

9. A method of producing nickel hydroxide from elemental nickel comprising the steps of:

a) introducing the elemental nickel particulate into an aqueous solution to form a mixture, said aqueous solution containing aqueous ammonia and the elemental nickel particulate of said mixture being activated for dissolution into said aqueous solution;

b) dissolving said activated elemental nickel particulate to provide dissolved nickel in said aqueous solution and to provide a negative potential for said mixture of said activated elemental nickel particulate and said aqueous solution, said negative potential being below about −100 mV;

c) adding oxygen to said aqueous solution at a rate that prevents said negative potential of said mixture of said activated elemental nickel particulate and said aqueous solution from increasing above about −100 mV to convert said dissolved nickel to nickel hydroxide; and d) precipitating said nickel hydroxide from said aqueous solution.

10. The method of claim 9 including the additional step of filtering nickel hydroxide from said aqueous solution.

11. The method of claim 9 wherein said aqueous solution has a pH between about 9 and 12 during said converting of said dissolved nickel to nickel hydroxide.

12. The method of claim 9 wherein said aqueous solution has a temperature between about 30° C. and boiling during said conversion of the dissolved nickel to nickel hydroxide.

13. The method of claim 9 wherein said aqueous solution has a temperature between about 30° C. and 60° C. for forming amorphous nickel hydroxide during said conversion of the dissolved nickel to nickel hydroxide.

14. The method of claim 9 wherein said negative potential of said mixture of said activated elemental nickel particulate and said aqueous solution of step c is between about −200 mV and −500 mV during said conversion of the dissolved nickel hydroxide.

15. The method of claim 9 wherein said aqueous solution is recycled after removal of nickel hydroxide for converting additional nickel particulate into nickel hydroxide.

16. The method of claim 9 wherein said aqueous solution is substantially free of anions.

17. The method of claim 9 wherein said precipitated nickel hydroxide is classified by size into a coarse fraction and a fine fraction; and said fine fraction of the said nickel hydroxide is recycled to said aqueous solution to grow said fine fraction into said coarse nickel hydroxide during said nickel hydroxide precipitation of step d).

18. The method of claim 9 wherein said nickel particulate is activated in a separate vessel prior to said introduction into said aqueous solution.

19. The method of claim 9 wherein the nickel hydroxide is precipitated at atmospheric pressure.

* * * * *